United States Patent [19]

Ueki et al.

[11] Patent Number: 4,617,207

[45] Date of Patent: Oct. 14, 1986

[54] THERMOPLASTIC RESIN SHEET

[75] Inventors: Toru Ueki; Yoshiaki Fukuda; Katsuyuki Usami; Kazuharu Kanasaki, all of Yokohama, Japan

[73] Assignee: Mitsui Toatsu Chemicals, Incorporated, Tokyo, Japan

[21] Appl. No.: 639,030

[22] Filed: Aug. 9, 1984

[30] Foreign Application Priority Data

| Aug. 15, 1983 | [JP] | Japan | 58-148140 |
|---|---|---|---|
| Mar. 5, 1984 | [JP] | Japan | 59-40441 |
| Mar. 13, 1984 | [JP] | Japan | 59-46524 |
| Mar. 13, 1984 | [JP] | Japan | 59-46525 |
| Mar. 13, 1984 | [JP] | Japan | 59-46526 |
| Mar. 13, 1984 | [JP] | Japan | 59-46527 |
| Mar. 13, 1984 | [JP] | Japan | 59-46528 |
| Apr. 16, 1984 | [JP] | Japan | 59-74885 |
| Apr. 16, 1984 | [JP] | Japan | 59-74886 |
| Apr. 16, 1984 | [JP] | Japan | 59-74887 |

[51] Int. Cl.$^4$ .............. C09K 19/00; B32B 27/36; B32B 27/08; B29D 23/04
[52] U.S. Cl. ........................... 428/1; 428/40; 428/332; 428/412; 428/419; 428/474.7; 428/475.2; 428/477.4; 428/481; 428/483; 428/479.3; 428/507; 428/516; 428/517; 428/519; 428/520; 428/518; 264/176.1; 350/370
[58] Field of Search ............ 428/332, 40, 516, 1, 428/412, 419, 474.7, 475.2, 477.4, 481, 479.3, 483, 507, 517, 519, 520, 518

[56] References Cited

U.S. PATENT DOCUMENTS

| 4,199,638 | 4/1980 | McKee | 428/131 |
|---|---|---|---|
| 4,348,349 | 9/1982 | Kurtz | 264/564 |
| 4,410,587 | 10/1983 | Fair et al. | 428/247 |

OTHER PUBLICATIONS

B. F. Greek, "Plastics Expand into New Markets", Chemical & Engineering News, Jun. 3, 1985, pp. 23, 24, 28, 36, 46.

Primary Examiner—P. C. Ives
Attorney, Agent, or Firm—Fisher, Christen & Sabol

[57] ABSTRACT

Disclosed herein are thermoplastic resin sheets having a thermal shrinkage within ±0.3%, and a process for producing thermoplastic resin sheets by co-extruding a first thermoplastic resin and a second thermoplastic resin which is nonadhesive to the first thermoplastic resin, into a sheet-like structure so that the first thermoplastic resin is covered on both surfaces thereof with the second thermoplastic resin and then peeling off the resulting outer layers of the second thermoplastic resin B to obtain a sheet of the first thermoplastic resin. The thermoplastic resin sheets obtained in accordance with the above production process have an extremely small thermal shrinkage, undergo an extremely low degree of mechanical strain, and exhibits a little optical anisotropy. Because of the small thermal shrinkage, they may be used in liquid crystal displays (LCDs), poultice or sticker. Because of their little optical anisotropy, they may also be used as supports for plate-like polarizers, coating films for plate-like polarizers or optical recording materials.

15 Claims, No Drawings

THERMOPLASTIC RESIN SHEET

BACKGROUND OF THE INVENTION (a) Field of the Invention:

This invention relates to a novel and improved thermoplastic resin sheet. More specifically, this invention relates to thermoplastic resin sheets substantially free of thermal expansion and shrinkage and/or having a low degree of optical anisotropy, and a production process therefor. This invention is also concerned with applications of these thermoplastic resin sheets.

(b) Description of the Prior Art:

The term "thermal shrinkage" as used herein means the dimensional change which a thermoplastic resin sheet undergoes when heated. The degree of dimensional change can be measured as a thermal shrinkage in accordance with, for example, Japanese Industrial Standard K 6734.

It has been known that sheets for use in stickers, label bases, liquid crystal displays (LCDs) or the like are required to have high levels of dimensional accuracy and cannot be used effectively if they develop dimensional changes, curling or the like upon application.

Thermoplastic resin sheets have hitherto been produced by the calendering technique or extrusion technique. However, the levels of the thermal shrinkage of sheets produced in accordance with these techniques have usually been about ±3% or, when their production was effected under such conditions as to minimize the levels of their thermal shrinkage, have still been about ±1% or so. If such conventional thermoplastic resin sheets are employed in applications requiring high levels of dimensional accuracy, such as labels, stickers, liquid crystal displays and the like, as mentioned above, they develop such problems when used, for example, in labels or stickers, as colors may be mismatched or patterns may be distorted upon printing, their glue may project out to smear their corresponding bases, or they may become readily separable or peelable in the course of use. Therefore, there has been a long standing demand for the development of thermoplastic resin sheets having much smaller levels of thermal shrinkage.

Optical recording has in recent years become widespread because it permits high density recording, fast recording, non-contact readout of records and excellent durability. Light-transmitting resin sheets are used in optical recording media in order to protect their record-bearing layers. These resin sheets are required to have low degrees of optical anisotropy for the following reasons: Polarized light such as laser beams or the like is used for optical recording. If a resin sheet has optical anisotropy, the quantity of light to be measured, for example, upon readout of a record varies, thereby producing considerable noise and considerably reducing accuracy.

Therefore, it is desired to provide sheets having low levels of optical anisotropy as light-transmitting resin sheets suitable for use in optical recording. As a production method for sheets having a low level of optical anisotropy, in other words, there has already been known the so-called solution casting method it has already been known to dissolve a thermoplastic resin in a solvent and to cause the resultant solution cast on a substrate. Even if this method is used, each of resulting sheets has only a very small area that is substantially free from optical anisotropy. Therefore, they cannot be used as large-sized optical recording materials. Further, their production costs are high. Under the circumstances, they can thus be used only in some extremely limited application fields. On the other hand, sheets available in accordance with the calendering or extrusion techniques have high levels of optical anisotropy and thus cannot be used as optical recording materials at present.

SUMMARY OF THE INVENTION

An object of this invention is to provide thermoplastic resin sheets having a small thermal shrinkage.

Another object of this invention is to provide thermoplastic resin sheets having a low level of optical anisotropy.

A further object of this invention is to provide an improved production process for thermoplastic resin sheets.

A still further object of this invention is to provide various applications of the above-mentioned thermoplastic resin sheets.

The present invention thus provides a thermoplastic resin sheet having a thermal shrinkage within ±0.3%.

The thermoplastic resin sheet according to this invention, which resin sheet has a low level of optical anisotropy, is obtained by co-extruding a first thermoplastic resin and a second thermoplastic resin nonadhesive to the first thermoplastic resin into a sheet-like structure so that the resulting layer of the former thermoplastic resin is covered on both surfaces thereof with layers of the latter thermoplastic resin, and then by peeling off both outer sheets made of the second thermoplastic resin.

The production process for a thermoplastic resin sheet, which process pertains also to the present invention, comprises co-extruding a first thermoplastic resin and a second thermoplastic resin which is nonadhesive to the first thermoplastic resin, into such a sheet-like structure so that the resulting layer of the first thermoplastic resin is covered on both surfaces thereof with layers of the second thermoplastic resin and then peeling off the outer layers made of the second thermoplastic resin to obtain a sheet made of the first thermoplastic resin.

DETAILED DESCRIPTION OF THE INVENTION

The thermoplastic resin sheet according to this invention is required to have a thermal shrinkage within ±0.3%. If the thermal shrinkage should exceed 0.3% as an absolute value, the thermoplastic resin sheet has poor dimensional accuracy and develops curling.

As illustrative thermoplastic resins usable in the above-described sheet, may be mentioned such thermoplastic resins as polyvinyl chloride resin compositions, polymethacrylate resins, polystyrene resins, acrylonitrile-butadiene-styrene resins, cellulose-base resins, polyethylene resins, polypropylene resins, acetal resins, polyamide resins, polyester resins, polycarbonate resins, polyphenylene oxide resins, polysulfone resins, methylpentene resins, ionomer resins, polyether sulfone resins, polyphenylene sulfide resins and high-nitrile resins.

Although the thermoplastic resins listed above by way of example may be shaped into sheet-like structures by the extrusion technique, calendering technique or solution casting technique, it is preferable to extrude a first thermoplastic resin and a second thermoplastic resin nonadhesive to the first thermoplastic resin into at least three layers so that the first thermoplastic resin forms a core layer and the second thermoplastic resin forms outer layers laminated on both surfaces of the core layer, and then to peel off the outer layers. It is preferable to choose resins which are adapted to form the core layer and the outer layers from the above-mentioned specific thermoplastic resins.

The sheets according to this invention can advantageously be used, owing to their characteristic feature of good dimensional accuracy, as substrates for a variety of stickers and panels, in liquid crystal displays, and in other fields.

Since the sheets according to this invention not only have small levels of thermal shrinkage but also develop extremely little mechanical strain, they can also be employed effectively for applications where mechanical strain is of primary concern.

According to the present invention, a thermoplastic resin sheet is produced by co-extruding a first thermoplastic resin and a second thermoplastic resin into a sheet-like structure so that the resulting layer of the first thermoplastic resin is covered on both surfaces thereof with outer layers of the second thermoplastic resin, and then by peeling off the outer layers of the second thermoplastic resin to obtain a sheet of the first thermoplastic resin.

As the first thermoplastic resin, vinyl chloride resins, polymethacrylate resins, polystyrene resins, acrylonitrile-butadiene-stryene resins, cellulose-base resins, polyethylene resins, polypropylene resins, acetal resins, polyamide resins, polyester resins, polycarbonate resins, polyphenylene oxide resins, polysulfone resins, methylpentene resins, ionomer resins, polyether sulfone resins, polyphenylene sulfide resins, and high-nitrile resins can be exemplified. Among these exemplary resins, vinyl chloride resins, polymethacrylate resins, polystyrene resins, polyester resins, methylpentene resins, polyamide resins, polycarbonate resins and cellulose-base resins are preferred.

The second thermoplastic resin useful in the practice of this invention is nonadhesive to the first thermoplastic resin, and its type can be chosen in view of the type of its matching first thermoplastic resin.

The first thermoplastic resin and the second thermoplastic resin, which can be used in the present invention, may be of any combination so long as layers of the second thermoplastic resin can be readily peelable from a layer of the first thermoplastic resin after their co-extrusion into a plurality of layers. Possible combinations are described in "Plastic World", January, 1980, PP 58–61 (see, the table on page 61). When a rigid vinyl chloride resin is chosen by way of example as the first thermoplastic resin, it is possible to choose as the matching second thermoplastic resin low-density polyethylene, high-density polyethylene, polypropylene, polystyrene, a cellulose-base resin, a nitrile-base resin or the like. The combination of a rigid vinyl chloride resin with low-density polyethylene is especially advantageous because their extrusion temperatures are close to each other.

The term "nonadhesiveness" as used herein embraces not only combinations in which neither resin layer adheres to the other but also combinations in which both resin layers are readily peelable.

In the present invention, the first thermoplastic resin and the second thermoplastic resin are co-extruded in such a way that the second thermoplastic resin covers both surfaces of the resulting layer of the first thermoplastic resin. The co-extrusion may be carried out by using the feed block method in which both resins are laminated by a feed block immediately before their entry to a T die and then fed to the T die (see, for example, U.S. Pat. Nos. 3,557,265, 3,476,627 and 4,336,012) or the multimanifold method in which both resins are laminated in a T die [see, for example, Kenkichi Murakami, "Plastics Age" 21(9), 74(1975)].

Pertaining to the laminated layer structure of the first and second thermoplastic resins to be obtained upon co-extrusion, it is generally advantageous to use the same resin as the second thermoplastic resin which makes up both outer layers, in other words, to take a structure of three layers made up of two types of resins, i.e., a 2/1/2-type structure because the above structure does not require handling a variety of resins. It is of course possible to use different of resins as the second thermoplastic resin making up both outer layers so that the resulting laminate takes a structure of three layers made up of three different resins, i.e., a 2/1/2'-type structure.

It may also be feasible to laminate additional layers made of another resin over the outer layers made of the second thermoplastic resin, for example, into a structure such as 3/2/1/2/3. Alternatively, the co-extruded laminate may take another structure such as 2/1/2/1/2. Further, it may also take a further structure of 2/1/3/1/2 so as to obtain a final sheet having the 1/3/1 structure. In addition it may also take a further structure 2/1/1'/2' wherein the resin 2' is nonadhesive to the resin 1' so as to take a final sheet having 1/1' structure.

The proportion of the thickness of the first thermoplastic resin in the total thickness of each co-extruded sheet-like laminate is preferably 90% or smaller. If the proportion should exceed 90%, the resulting sheet of the first thermoplastic resin has a larger thermal shrinkage and develops optical anisotropy. Therefore, use of such a high proportion is not desired.

The peeling-off of the outer sheets made of the second thermoplastic resin from the sheet-like laminate can be effected with ease because the first and second thermoplastic resins are nonadhesive to each other. It is desirable to peel off the outer sheets immediately before using the core layer in order to keep the core layer free from deposition of dust or the like.

The first thermoplastic resin useful in the practice of the process of this invention may contain a variety of stabilizers, colorants, pigments, fillers, lubricants, surfactants and the like without causing problems.

Thermoplastic resin sheets obtained in accordance with the process of this invention not only have small levels of thermal shrinkage but also exhibit extremely low levels of mechanical strain and optical anisotropy. Further, they are free from deposition of adhesion of dust or the like in the course of production, shipping, cutting or the like because they are covered with sheets of the second thermoplastic resin. Therefore, they are suited for the above-mentioned applications. In addition, because of their characteristic feature of low optical anisotropy, they may also be used advantageously in various optical recording materials and other applications.

The thermoplastic resin sheet and its production process, both pertaining to the present invention, will hereinafter be described more specifically in the following examples:

EXAMPLE 1

Using a 65 mm$\phi$ extruder, a 40 mm$\phi$ extruder, a feed block of the two resin/three layer type, a coat hanger T die, cooling rolls and a take-off unit, a rigid polyvinyl chloride resin ["MITSUI VINYCHLON 4000 LL (trade mark) with a tin-base stabilizer added; hereinafter abbreviated as "PVC"] and low-density polyethylene [NISSEKI REXLON F-41 (trade mark); hereinafter abbreviated as "LDPE"] were fed through the 65 mm$\phi$ extruder and the 40 mm$\phi$ extruder, respectively, to form a multilayered sheet of LDPE/PVC/LDPE = 0.3 mm/0.4 mm/0.3 mm. The extrusion was carried out at a resin temperature of 170° C. for both PVC and LDPE and a sheet-drawing speed of 1 m/min.

Thereafter, the LDPE sheets were peeled off and the thermal shrinkage of the thus-obtained PVC sheet was measured in accordance with Japanese Industrial Standard K 6734 and found to be 0.1%. [For reference, the measurement method defined in Japanese Industrial Standard K 6734 is as follows. A test piece of 120 mm wide and 120 mm long is prepared. Reference points A, B and C, D are chosen in the long and wide direction, respectively, in such a way that the distances A-B and C-D are each 100 mm. The test piece is then maintained at 100 ±2° C. for 10 minutes while being held horizontally. While still being held in the horizontal position, the test piece is cooled to room temperature. Then, the distances A-B and C-D are individually measured. Its longitudinal or lateral degree of shrinkage, S(%), is calculated in accordance with the following equation:

$$S = \frac{l_2 - l_1}{l_1} \times 100$$

where $l_1$: the distance between the reference points before heating (mm); and $l_2$: the distance between the reference points after heating (mm).]

The optical anisotropy of the PVC sheet obtained in accordance with the above-described production process was measured by a strain gauge, Model SV-18 manufactured by Toshiba Corporation. No optical anisotropy was observed. Further, the double refractive index of the above-obtained sheet was also measured by a polarizing microscope equipped with a Berek compensator (manufactured by Olympus Optical Co., Ltd.) and was found to be $1 \times 10^{-5}$.

EXAMPLE 2

A 0.4 mm-thick polystyrene sheet was prepared in the same manner as in Example 1 except that the vinyl chloride resin composition and low-density polyethylene were changed to polystyrene [TOPOLEX 555 (trade mark); hereinafter abbreviated as "PS"] and polypropylene [MITSUI NOBLEN (trade mark)], respectively. The thermal shrinkage of the PS sheet was found to be 0.1% after its measurement. Its double refractive index was $2 \times 10^{-5}$ and no optical anisotropy was observed.

COMPARATIVE EXAMPLE 1

Using the same 60 mm$\phi$ extruder, T die, cooling rolls and take-off unit as those employed in Example 1, the same vinyl chloride resin composition as that used in Example 1 was extruded under the same conditions as those followed in Example 1 to obtain a single-layered PVC sheet 0.4 mm thick.

The thermal shrinkage of the thus-obtained PVC sheet was measured in the same manner as in Example 1. It was found to be 1%. Furthermore, its double refractive index was $3 \times 10^{-4}$ and significant optical anisotropy was observed.

The thermoplastic resin sheets obtained in accordance with the process of this invention have low optical anisotropy. In particular, those having retardation values (hereinafter called "R values") of 20 m$\mu$ or smaller are suitable as supports for plate-like polarizers. The term "R value" is a unit representing the double refraction of each film and is expressed in terms of the product of the thickness d of the film and the absolute value $|n_1 - n_2|$ of the difference between two refractive indexes measured in directions vertical to the film, as follows:

$$R = d|n_1 - n_2|$$

wherein $n_1$ is the refractive index in a first direction, and $n_2$ is the refractive index in a direction perpendicular to the first direction.

If the R value of a sheet exceeds 20 m$\mu$, this sheet is not suitable for use as a support in a plate-like polarizer because it will develops image fringes.

It is particularly preferable to make sheets which are to be used as supports in plate-like polarizers with a vinyl chloride resin composition, polymethylmethacrylate, polycarbonate, cellulose-base resin or methylpentene resin. The thicknesses of such sheets preferably ranges from 20-2500 $\mu$m, although they may vary depending on their rigidity levels.

A plate-like polarizer obtained by applying a polarizing film over the above-mentioned support can provide extremely sharp images without developing image fringes which are often seen in the case of plate-like polarizers using conventional thermoplastic resin sheets as supports. Another merit is that it is possible to provide a thin plate-like polarizer having excellent mechanical strength without such problems as the fragility and large thicknesses of conventional plate-like polarizers using glass plates as supports. Because of the above merit, plate-like polarizers using thermoplastic resin films according to this invention can be used in various fields such as display devices, television filters, stereoscopic movies and dark glasses.

An Example of plate-like polarizers using, as supports, the thermoplastic resin sheets obtained in accordance with the process of this invention will next be given together with a Comparative Example.

EXAMPLE 3

A PVC sheet was obtained by forming a multilayered film of LDPE/PVC/LDPE=60/80/60 $\mu$m and then peeling the LDPE layers off the multilayered film in accordance with the procedure of Example 1. The R value of the thus-obtained sheet was measured by a polarizing microscope equipped with a Berek compensator (manufactured by Olympus Optical Co., Ltd.) and was found to be 8 m$\mu$.

A polarizing film was adhered to the above-obtained PVC sheet in a manner known per se in the art to prepare a plate-like polarizer 500×500 mm wide and 200 $\mu$m thick.

The plate-like polarizer was then assembled in a display device and its performance was evaluated. The plate-like polarizer provided sharp images.

COMPARATIVE EXAMPLE 2

A plate-like polarizer was prepared in the same manner as in Example 3, using a commercial PVC sheet of 80 μm thick (retardation value: 50 mμ). Its performance was evaluated. It developed image fringes and was hence unable to provide sharp images.

The thermoplastic resin films produced in accordance with the process of this invention are suitable as coating films for plate-like polarizers, preferably when their R values are 20 mμ or smaller, preferably 10 mμ or smaller, and their moisture permeability levels are 200 g/m²·24 hrs or less. Thermoplastic resin films having R values in excess of 20 mμ are not preferred since, when employed as coating films in plate-like polarizers, they develop image fringes. Any moisture permeability levels exceeding 200 g/m²·24 hrs modify the polarizing films or develop swelling between the polarizing films and their matching coating films. Since the R value and the moisture permeability of each thermoplastic resin sheet according to this invention can be controlled within the ranges mentioned above, the thermoplastic resin sheet can be suitably used as a coating film for a plate-like polarizer.

Here, the term "moisture permeability" means the amount of steam allowed to pass through a film-like material of a unit area during a prescribed constant time period. It is measured in accordance with Japanese Industrial Standard Z 0208 to be described later in this specification.

It is particularly preferred to form such films with a vinyl chloride resin composition or polycarbonate. A thermoplastic resin is formed into a film of 10–1000 82 m thick or preferably 15–200 μm thick although its thickness may vary depending on its moisture permeability. The resulting film is adhered as a coating film over a polarizing film to form a plate-like polarizer.

The coating film produced in accordance with the process of this invention is free of such a defects as in conventionally-used triacetate films in which the film undergoes change as a result of moisture absorption.

An Example on a plate-like polarizer obtained using the above-mentioned coating film will next be given together with a Comparative Example.

EXAMPLE 4

Following the procedures of Example 1, a multilayered film of LDPE/PVC/LDPE =20/40/20 μm was extruded and the LDPE layers were peeled off from the multilayered film to obtain a PVC film.

The R value of the thus-obtained PVC film was measured by a polarizing microscope equipped with a Berek compensator (manufactured by Olympus Optical Co., Ltd.) and was found to be 8 mμ.

Its moisture permeability was also measured in accordance with Japanese Industrial Standard Z 208 and was found to be 55 g/m²·24 hrs. [For reference, the measurement method defined in Japanese Industrial Standard Z 0208 is as follows: Using a film as a boundary plane at 25° C., the air at one side of the film is maintained at a relative humidity of 90% while the air at the other side is kept in a dry state with a moisture absorbent. The weight (g) of stream passed through the boundary plane in 24 hours is converted into a weight per m² of the sheet to use the latter weight as moisture permeability (g/m²·24 hrs).]

Two sheets of the same type as that obtained above were then adhered to both surfaces of a polarizing film to prepare a plate-like polarizer, which was then assembled in a display device for evaluation of its performance. It was confirmed that the plate-like polarizer gave sharp images for a long period of time without performance deterioration.

COMPARATIVE EXAMPLE 3

A vinyl chloride resin composition of the same type as that used in Example 1 was extruded from a 65 mmφ extruder into a film 40 μm thick. Its R value was 35 mμ. Further, two pieces of the film were adhered respectively on the outer surfaces of a polarizing film to prepare a plate-like polarizer. The plate-like polarizer was assembled in a display device for evaluation of its performance. As a result, it developed color fringes and was thus found to be unsuitable for actual use.

Since thermoplastic resin sheets available in accordance with the co-extrusion technique of this invention have small R values, they may be used as optical recording materials such as compact disks, video disks and the like. The R values of sheets suitable for such applications are 100 mμ or smaller or preferably, 50 mμ or smaller. As a material for such sheets, vinyl chloride resin compositions, polycarbonates and methylpentene resins are particularly preferred.

In the process of optical recording, fine pits of a stamper are transferred to thermoplastic resin sheets by pressing on a press equipped with the stamper. Subsequently, the sheets are fabricated into a compact disks or video disks through such process steps as forming reflecting films, coating protecting films and printing labels.

Examples of compact disks and video disks will hereinafter be given together with a Comparative Example.

EXAMPLE 5

Using a 65 mmφ extruder, a 40 mmφ extruder, a feed block of the two resin/three layer type, a coat hanger T die, cooling rolls and a take-off unit, a vinyl chloride resin ['MITSUI VINYCHLON 4000 LL (trade mark) with a stabilizer added; hereinafter abbreviated as "PVC"]and low-density polyethylene [NISSEKI REXLON F-41 (trade mark); hereinafter abbreviated as "LDPE"]were fed respectively through the 65 mmφ extruder and the 40 mmφ extruder to form a multilayered sheet of LDPE/PVC/LDPE=0.7 mm/1.1 mm/0.7 mm. The extrusion was carried out at a resin temperature of 170° C. for both PVC and LDPE and at a sheet-drawing speed of 0.5 m/min.

The LDPE sheets were then peeled off the multilayered sheet and the retardation value of the thus-obtained sheet was measured by a polarizing microscope equipped with a Berek compensator (manufactured by Olympus Optical Co., Ltd.). The retardation value was 40 mμ.

Thereafter, a compact disk was fabricated from the above sheet in a manner commonly known in the art and its performance was evaluated. The sheet provided a high-performance compact disk having a low level of noise.

In addition, a video disk was also fabricated from the sheet in a common manner and its performance was evaluated. The video disk did not develop deformations by absorption of moisture. It also gave good picture quality.

COMPARATIVE EXAMPLE 4

A vinyl chloride resin composition of the same type as that used in Example 5 was extruded from a 65 mm$\phi$ extruder to obtain a sheet 1.1 mm thick. Since its retardation value was as large as 150 m$\mu$, thus, it could not be used as a substrate for compact disks or video disks.

EXAMPLE 6

A multilayered sheet of LDPE/PC/LDPE=0.7/1.0/0.7 mm was extruded in the same manner as in Example 5 except that a polycarbonate (hereinafter called "PC") was used instead of the vinyl chloride resin composition. The extrusion of PC was carried out at 300° C. Following the procedures of Example 5, the measurement of the retardation value of the PC sheet and its fabrication into a compact disk and video disk were carried out so as to evaluate its performance. The retardation value of the PC sheet was found to be 45 m$\mu$. The performance of the compact disk and video disk, both fabricated from the above sheet, were good.

The optical recording materials formed of the above-described thermoplastic resin sheets were free of optical anisotropy. Further, unlike the conventional optical recording materials made of polymethacrylate resins, they did not absorb moisture.

The thermoplastic resin sheets of this invention, the thermal shrinkage of which is within ±0.3%, are also suitable as substrates for poultices. The conventional thermoplastic resin sheets used for this purpose have been subject to either expansion or shrinkage. Thus, they have been accompanied by the drawback that their medicated mass layers tended to project out or to separate from the substrates. When a thermoplastic resin sheet according to this invention, was used as a substrate, the resulting poultices did not develop such problems as their medicated mass layers projecting out or separating from the substrates during their storage or use or sticking together during storage. If the above sheet is produced by the co-extrusion technique, it is extremely beneficial from the viewpoint of hygiene because it can be produced with cover sheets.

The thickness preferably range from 20 to 500 $\mu$m when the sheet is used as a substrate. A soft mass containing some pharmaceutically-effective components is coated on the substrate, a cover film is applied over the thus-coated soft mass, and the resulting laminate is cut into poultices.

An Example on the above-described poultice will next be given together with a Comparative Example.

EXAMPLE 7

Using a 65 mm$\phi$ extruder, a 40 mm$\phi$ extruder, a feed block of the two resin/three layer type, a coat hanger T die, cooling rolls and a take-off unit, a vinyl chloride resin ["MITSUI VINYCHLON 4000 LL (trade mark) with a plasticizer and stabilizer added; hereinafter abbreviated as "PVC"]and low-density polyethylene [NISSEKI REXLON F-41 (trade mark); will hereinafter be abbreviated as "LDPE"]were fed through the 65 mm$\phi$ extruder and the 40 mm$\phi$ extruder, respectively, to form a multilayered sheet of LDPE/PVC/LDPE= 60/80/60 $\mu$m. The extrusion was carried out at a resin temperature of 170° C. for both PVC and LDPE and at a film-drawing speed of 5 m/min.

Thereafter, the LDPE films were peeled off the multilayered film to produce a PVC film suitable as a substrate. The thermal shrinkage of the film, as measured in accordance with Japanese Industrial Standard K 6734, was found to be 0.1%.

A medicated mass was coated on the above-obtained PVC film, a cover film was applied over the thus-coated medicated mass, and the resulting laminate was cut into poultices. The poultices were then applied to human shoulders to evaluate their effectiveness. The poultices did not separate nor did their medicated mass layers project out.

COMPARATIVE EXAMPLE 5

Poultices were produced in the same manner as in Example 7 except that a commercial soft vinyl chloride film 80 $\mu$m thick (thermal shrinkage: 1%) was employed. Their effectiveness were evaluated. The poultices were found to separate at the outer peripheral portions thereof and their medicated mass layers projected partly from their corresponding substrates. In addition, the medicated mass adhered on clothing.

The thermoplastic resin films according to this invention, the thermal shrinkage of which is within ±0.3%, preferably ±n 0.2%, can also be used suitably as substrates for stickers as mentioned above.

Stickers have hitherto been produced by using paper sheets or thermoplastic resin films as substrates and printing such substrates. However, conventional stickers making use of paper sheets as their substrates are accompanied by the drawback that they are not resistant to water. On the other hand, stickers using thermoplastic resin films as their substrates are waterproof, but have a number of drawbacks. For example, prints may be displaced or patterns may be deformed as the thermoplastic resin making up the substrates may shrink during printing the substrates, the substrate films may shrink in the course of use or storage, the glue may project out from the substrate films and may thus smear bases, the stickers may separate from the bases or may stick together during storage.

Use of the film of this invention can solve the drawbacks of such conventional stickers. The thickness of the film to be used as a substrate is preferably within the range of 20–500 $\mu$m. Its color may be white, yellow, blue and so on depending on the end use. Its coloration can be effected by adding one or more pigments to the starting thermoplastic resin upon formation of the film.

Such substrate films are printed, glued and then cut into stickers. The stickers according to this invention have such merits that they permit fine multicolor printing, their glues do not project out during their application and they do not separate. Because of these merits, they may be used in a wide variety of applications.

Examples of these stickers will next be given together with a Comparative Example.

EXAMPLE 8

Following the procedures of Example 1, a multilayered film of LDPE/PVC/LDPE =0.3/0.4/0.3 mm was extruded and the LDPE layers were peeled off the multilayered film to obtain a PVC film. The thermal shrinkage of the thus-obtained film was measured in accordance with Japanese Industrial Standard K 6734. Results are given in Table 1.

The PVC film was printed, glued and then cut into stickers. The stickers were applied on a glass substrate and a weathering test was carried out thereon for 3 months. Results are also given in Table 1.

EXAMPLE 9

The procedures of Example 1 were repeated except for replacement of PVC with methacrylic resin, thereby obtaining a methacrylic resin film 0.4 mm thick. Using the methacrylic resin film as a substrate, stickers were produced in the same manner as in Example 10. The thermal shrinkage of the methacrylic resin film as the substrate and results of a weathering test on the stickers are shown in Table 1.

COMPARATIVE EXAMPLE 6

Stickers were produced in the same manner as in Example 8 except that a commercial PVC film was used as a substrate film. The thermal shrinkage of the PVC film as the substrate film and results of a weathering test on the stickers are given in Table 1.

TABLE 1

| Example | Thermal shrinkage (%) | Weathering test results |
|---|---|---|
| Example 8 | 0.1 | Neither glue projection nor sticker separation. |
| Example 9 | 0.1 | Neither glue projection nor sticker separation. |
| Comp. Ex. 6 | 1 | Projected glue smeared the glass substrate; stickers separated at their peripheral portions from the glass substrate. |

The thermoplastic resin films according to this invention which sheets have a thermal shrinkage within ±0.3% and an R value of preferably 20 mµ or smaller or particularly 10 mµ or smaller, are suitable as cover films for LCDs. Properties required as a cover film suitable for use in LCDs are that, while the film is used, it is not deformed due to expansion or shrinkage and that it does not render images unsharp due to double refraction.

If an LCD is fabricated by using a thermoplastic resin film having a thermal shrinkage in excess of 0.3% in combination with a liquid crystal composition and a polarizing film, the LCD develops some deformation during its use. Accordingly, use of such a thermoplastic resin film is not preferred. When a thermoplastic resin film having an R value higher than 20 mµ is used, it is impossible to provide sharp images. Thus, use of such a thermoplastic resin film is also not preferred.

It is preferable to use methylpentene resin, polyether sulfone, polyethylene terephthalate or the like to form films which are to be used as cover films for LCDs. The thickness of each cover film is preferably in the range of 30–200 µm.

One or both surfaces of each cover films suitable for use in LCDs may be converted to an electrically-conductive transparent film or films. The resulting cover films may be combined with a liquid crystal composition and polarizing films for use as LCDs in watches, clocks, electronic desktop and portable calculators, automobile instrument panels and portable TVs, among others.

Examples of the use of the thermoplastic resin films obtained in accordance with the process of this invention as cover films for LCDs will next be given together with a Comparative Example:

EXAMPLE 10

Following the procedures of Example 1, a multilayered film of PP/methylpentene resin/PP=50/100/50 µm was extruded and the PP layers were peeled off from the multilayered film to obtain a methylpentene resin film. Here, "MITSUI NOBLEN JS-G" and 'TPX' (trade mark; product of Mitsui Petrochemical Industries, Ltd.) were used as the PP and methylpentene resin, respectively. By the way, the extrusion temperatures of PP and TPX were 270° C. and 290° C., respectively. The thermal shrinkage of the thus-obtained methylpentene resin film was 0.1% at 150° C., while its R value was 9 mµ. A mixture consisting of 95 wt.% $In_2O_3$ and 5 wt.% $SnO_2$ was deposited at a deposition velocity of 15 Å/sec under vacuum of $5 \times 10^{-5}$ Torr on the methylpentene resin film to form an electrically-conductive film 120 Å thick.

The electrically-conductive, transparent methylpentene resin film was combined as a liquid crystal protecting film with a liquid crystal composition and a polarizing film to fabricate an LCD. In performance, it gave sharp images, its visual angle was wide, its overall thickness was as thin as 0.7 mm and it was light weight. It was also more flexible than LCDs constructed of glass plates.

EXAMPLE 11

A multilayered film of PP/PES/PP=50/100/50 µm was obtained following the procedures of Example 10 except that polyether sulfone ("PES 300P", trade mark; produced by Imperial Chemical Industry, United Kingdom; hereinafter abbreviated as "PES") was used in lieu of the methylpentene resin. The extrusion temperatures of PP and PES were 290° C. and 350° C., respectively. The PP layers were then peeled off the multilayered film to obtain a PES film. The thermal shrinkage of the thus-obtained PES film was 0.1% at 150° C., while its R value was 10 mµ. An LCD was fabricated in the same manner as in Example 10. It produced sharp images.

COMPARATIVE EXAMPLE 7

A methylpentene resin of the same type as that used in Example 10 was extruded from a 65 mmφ extruder to obtain a film 100 mµ thick. The thermal shrinkage of the film was 0.6% at 150° C., while its R value was 40 mµ. Using this film, an LCD was fabricated in the same manner as in Example 10. However, the resulting images contained color fringes. Thus, the film was not suitable for use in LCDs.

What is claimed is:

1. Thermoplastic resin sheet having a thermal shrinkage within ±0.3 percent and double refractive index of $8 \times 10^{-5}$ or smaller, said thermoplastic resin sheet being produced by co-extruding a first thermoplastic resin and a second thermoplastic resin which is nonadhesive to said first thermoplastic resin, said first thermoplastic resin being a rigid polyvinyl chloride resin, polystyrene resin or methylpentene resin and said second thermoplastic resin being a low-density polyethylene resin, high-density polyethylene, polyproplylene resin, polystyrene resin or cellulose-base resin, into a three-layered sheet in which a core layer of said first thermoplastic resin is covered on both surfaces thereof with outer layers of the second thermoplastic resin, the proportion of the thickness of said first thermoplastic resin being controlled to below 90 percent of the total thickness of said co-extruded sheet, and by peeling the outer layers of said second thermoplastic resin off said co-extruded three-layered sheet to obtain a sheet of said first thermoplastic resin.

2. The plate-like polarizer comprising as its support a thermoplastic resin sheet as claimed in claim 1, which thermoplastic resin sheet has a low level of optical anisotropy.

3. The plate-like polarizer as claimed in claim 2, wherein the retardation value of the thermoplastic resin sheet is 20 m$\mu$ or smaller.

4. The plate-like polarizer as claimed in claim 2, wherein the thermoplastic resin sheet has been obtained from a polyvinyl chloride resin composition.

5. The plate-like polarizer as claimed in claim 1 comprising as a coating film a thermoplastic resin sheet as claimed in claim 1 having a low level of optical anisotropy.

6. The plate-like polarizer as claimed in claim 5, wherein the moisture permeability of the thermoplastic resin sheet is 200 g/m$^2$·24 hrs.

7. The plate-like polarizer as claimed in claim 5, wherein the retardation value of the thermoplastic resin sheet is 20 m$\mu$ or smaller.

8. A plate-like polarizer as claimed in claim 5, wherein the thermoplastic resin sheet has been obtained from a polyvinyl chloride resin.

9. The optical recording material comprising a thermoplastic resin sheet as claimed in claim 1, which thermoplastic resin sheet has a low level of optical anisotropy.

10. The optical recording material as claimed in claim 9 wherein the thermoplastic resin sheet has a retardation value of 100 m$\mu$ or smaller.

11. The optical recording material as claimed in claim 9 wherein the thermoplastic resin sheet has been obtained from a rigid polyvinyl chloride resin, Polycarbonate or methylpentene resin.

12. The poultice comprising a substrate which is a thermoplastic resin sheet as claimed in claim 1.

13. The liquid crystal display comprising a film covering which is a thermoplastic resin sheet as claimed in claim 1.

14. The thermoplastic resin sheet as claimed in claim 1, wherein the first thermoplastic resin is a vinyl chloride resin, polymethacrylate resin, polystyrene resin, acrylonitrile-butadiene-styrene resin, cellulose-base resin, polyethylene resin, polypropylene resin, acetal resin, polyamide resin, polyester resin, polycarbonate resin, polyphenylene oxide resin, polysulfone resin, methylpentene resin, ionomer resin, polyether sulfone resin, polyphenylene sulfide resin or high-nitrile resin.

15. The thermoplastic resin sheet as claimed in claim 1, wherein the second thermoplastic resin is nonadhesive to the first thermoplastic resin and is selected from a vinyl chloride resin, polymethacrylate resin, polystyrene resin, acrylonitrile-butadiene-styrene resin, cellulose-base resin, low-density or high-density polyethylene resin, polypropylene resin, acetal resin, polyamide resin, polyester resin, polycarbonate resin, polyphenylene oxide resin, polysulfone resin, methylpentene resin, ionomer resin, polyether sulfone resin, polyphenylene sulfide resin or high-nitrile resin.

* * * * *